Figure 1:
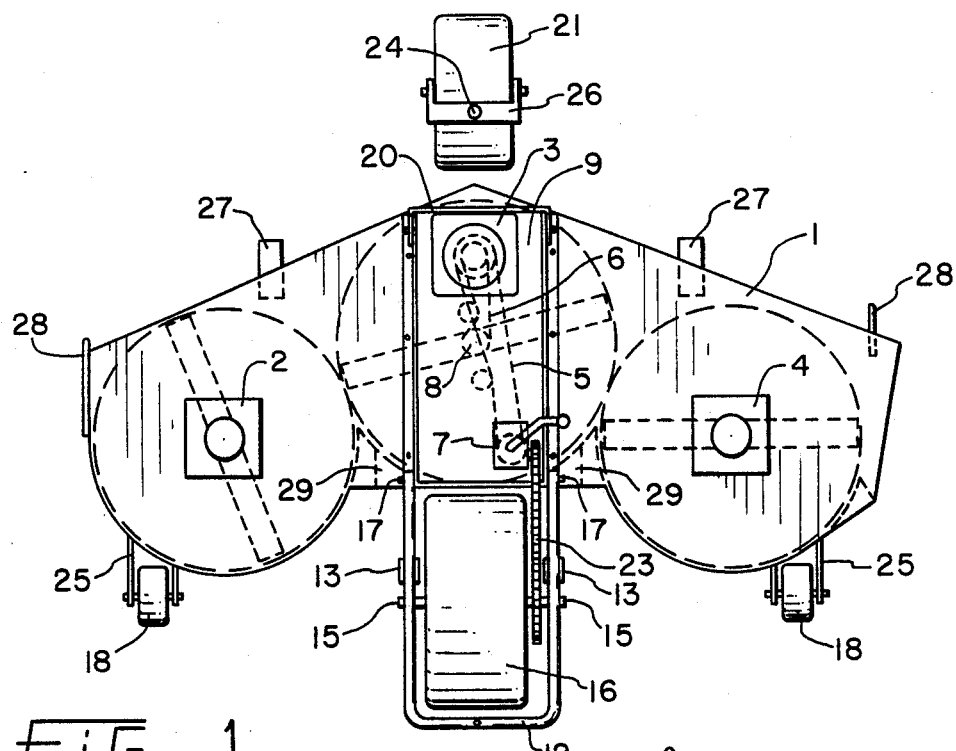

United States Patent [19]

Geiger

[11] Patent Number: 4,914,894
[45] Date of Patent: Apr. 10, 1990

[54] SHORT TURN IMPLEMENT OR VEHICLE

[76] Inventor: Ervin D. Geiger, 11346 Avery Rd., Palm Beach Gardens, Fla. 33410

[21] Appl. No.: 28,340

[22] Filed: Feb. 20, 1987

Related U.S. Application Data

[63] Continuation-in-part of Ser. No. 771,242, Feb. 19, 1987, abandoned.

[51] Int. Cl.$^4$ .................................... A01D 34/66
[52] U.S. Cl. ........................ 56/14.7; 56/DIG. 22; 56/6; 56/17.5; 180/19.1; 180/219
[58] Field of Search ............. 56/16.7, 16.9, DIG. 22, 56/10.7, 14.7, 6, 7, 249; 180/19.1, 19.3, 219; 280/293, 296

[56] References Cited

U.S. PATENT DOCUMENTS

| 2,705,393 | 5/1955 | Cofer | 56/14.7 |
| 2,765,861 | 10/1956 | Ekas | 56/14.7 |
| 2,792,898 | 5/1957 | Mast | 56/14.7 |
| 2,891,370 | 6/1959 | Musgrove | 56/14.7 |
| 3,110,352 | 11/1963 | McClarnon | 56/14.7 |
| 3,264,807 | 8/1966 | Wallace | 56/13.6 |
| 3,630,010 | 12/1971 | Rester | 56/15.8 |
| 3,700,059 | 10/1972 | Sutton | 280/293 |
| 4,041,678 | 8/1977 | Chaney et al. | 56/DIG. 22 |
| 4,574,909 | 3/1986 | Ribi | 180/227 |

FOREIGN PATENT DOCUMENTS

| 166771 | 6/1954 | Australia | 56/14.7 |
| 1383102 | 11/1964 | France | 56/14.7 |
| 1430250 | 1/1965 | France | 56/14.7 |
| 1062387 | 3/1967 | United Kingdom | 56/14.7 |

Primary Examiner—John Weiss

[57] ABSTRACT

A "short turn" powered vehicle having a transverse structural mower housing or implement that is used to also vertically stablize the unit. One embodiment uses a self powered mower housing with lateral support wheels which also give lateral support, as do the choice of implements, by means of a vertically restricting hinge in relation to a powered drive wheel; thus the drive wheel is in a floating mode as it gives thurst to the housing or implement, so as to always have traction on uneven ground.

On each of the embodiments steering is done by, either a generally centrally located steered front support wheel steered from a rearward operator's seat on the vehicle, or steering being from an operator's seat rearward on the vehicle, by breaking of either of the housing's or implement's lateral support wheels and there being at least one castor type front support wheel or lateral front support wheels located close to the rear support wheels. Or by hand mower type handles mounted on the rear of the vehicle drive wheel frame, without the operators seat, but with at least one front caster type support wheel. In each of the steering modes, except the one, steering is done by the thrust of the rear drive wheel around one of the lateral housing or implement's support wheels. The vehicle is vertially stabilized by the vertically restricted pivoting hinge with a rear drive wheel that is in a floating mode in relation to the housing or implement.

37 Claims, 4 Drawing Sheets

SHORT TURN IMPLEMENT OR VEHICLE

This application is a continuation in-part of my copending application Ser. No. 771,242, filed 2/19/87, now abandoned.

BACKGROUND SUMMARY OF THE INVENTION

This invention relates to the self-propelled riding, garden tractor type, and hand mowers.

The object of this invention is to provide an improved vehicle and a mower that is capable of turning in a short-turn radius and reduce the normal hand trimming and yet mow faster and easier. Also an object is to provide a much more simple machine to manufacture with less parts, maintence, and break-down time.

Most riding mowers now, use v-belts between the vehicle and the mower housing. Thus as the mower moves over the uneven terrain, the angle alignment changes and causes more friction and loss of power efficiency also loss of belt life, thus more break-down time and also more maintence cost. With the present invention there is less than half the number of belts and all belts, except in one embodiment, are in constant alignment. With the power source mounted directly to the mower housing, there is less loss of power and less power transfer machinery needed, hence less manufacturing costs and maintenance.

Most riding mowers now in operation use four wheels to maintain lateral stability, while the mower housing's front part is carried by the vehicle and the rear is supported by lateral support wheels.

With the present invention the rear of the housing is supported by lateral support wheels also, they are also used for lateral stability by the use of a pivoting hinge fixed to the mower housing's central section, then it extends rearward and frames a rear drive wheel. This hinge restricts all but vertical movement, if only one drive wheel is used and it is in a floating mode so as to always have traction on uneven terrain. The rear drive wheel is also substantially in line, laterally, with the rear housing wheels, (on most embodiments). This makes it easier for the mower or vehicle to make a short-turn radius as it pivots around one of the lateral housing support wheels. On some embodiments the mower is steered by breaking one of the outside lateral support wheels, one by use of at least one steerable front wheel, one by handle bars for the hand mower and at least one front castor support wheel, and one by forward and reverse powered lateral housing support wheels. It will be noted that the housing itself is the mowing vehicle on all but one of the embodiments. The rest have either a seat fixed on the rear central section of the drive wheel frame or the central section of the mower housing, or a handle mounted on the drive wheel frame, in the case of a hand mower.

Now to the embodiment where the housing is not used as the vehicle; in this one the drive motor is mounted on a forward section of a rigid frame, and the drive wheel is rigidly mounted on the aft section of the same frame and the apparatus or implement is mounted on the under side of the front section of the frame by the same type of piviting hinge that restricts all but vertical movement, letting the full vehicle frame float in relation to the housing or apparatus. This allows the rear wheel to always have traction on uneven ground. This also gives two wheeled vehicles the same lateral stability as the others embodiments. Thus one drive wheel and at least one front steerable wheel will do a better job than the conventional four wheels and still maintain better lateral support. Again this makes for less manufacture and maintenance costs.

Others have attempted to use just one drive wheel and one front steerable wheel, but the result was even more machinery, a case in point is Chaney et al (4,041,687), they also have a rear drive wheel, a front steerable wheel, and lateral support wheels on a special vehicle frame, for lateral stabilization. Yet they float the mower housing on this elaborate frame with rollers to restrict all but vertical movement of the vehicle frame, instead of just floating the drive wheel as is the case of the present invention. Thus they are actually using more machinery than the conventional four wheel vehicles, much like the rest of the art.

BRIEF DISCRIPTION OF THE DRAWINGS

Figure 2:
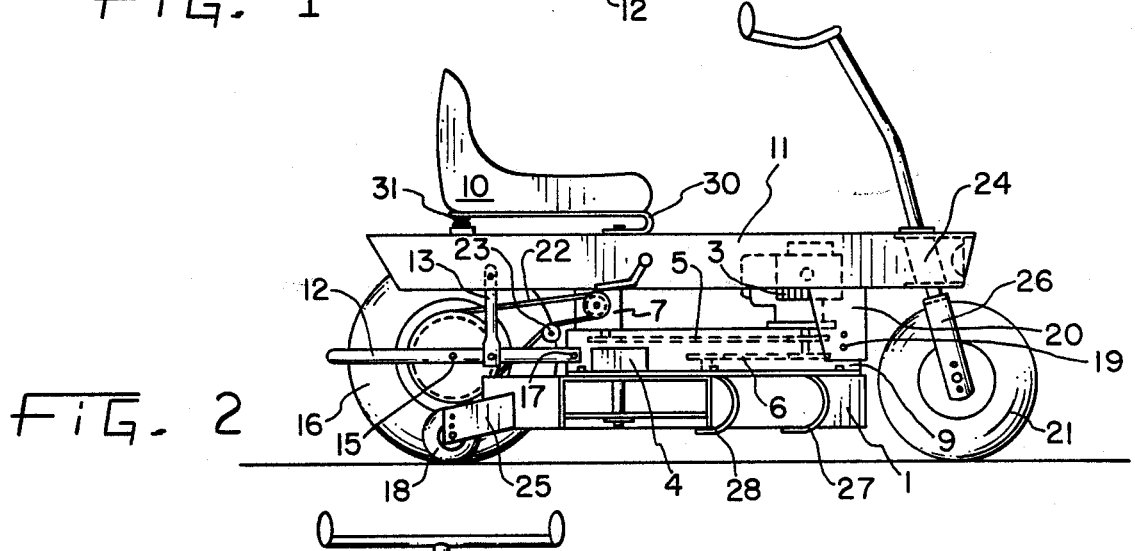

FIG. 1. Is a top view,

FIG. 2. Is a side view.

Figure 3:
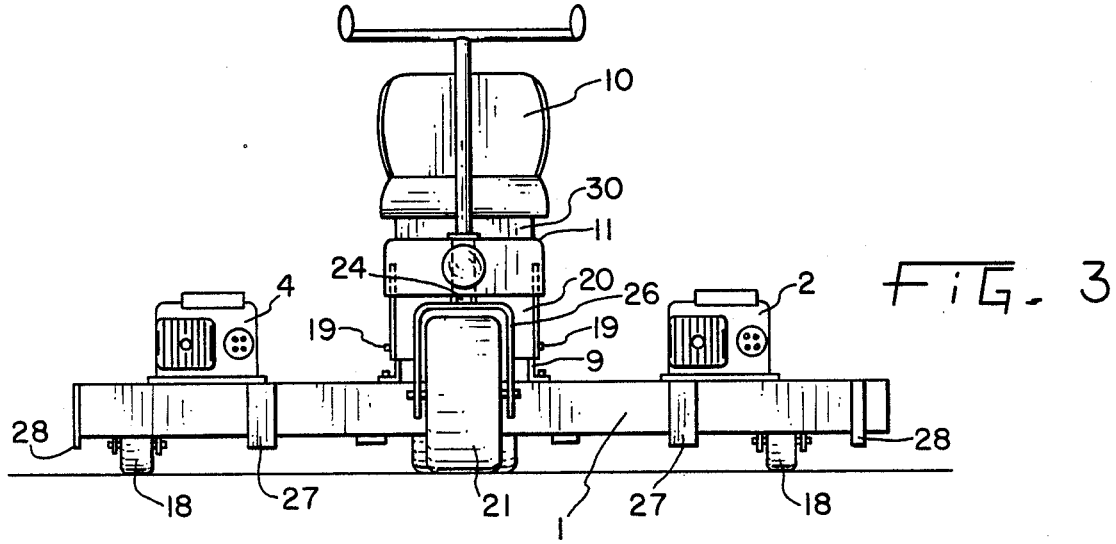

FIG. 3. Is a front view, each view of the basic invention.

Figure 4:
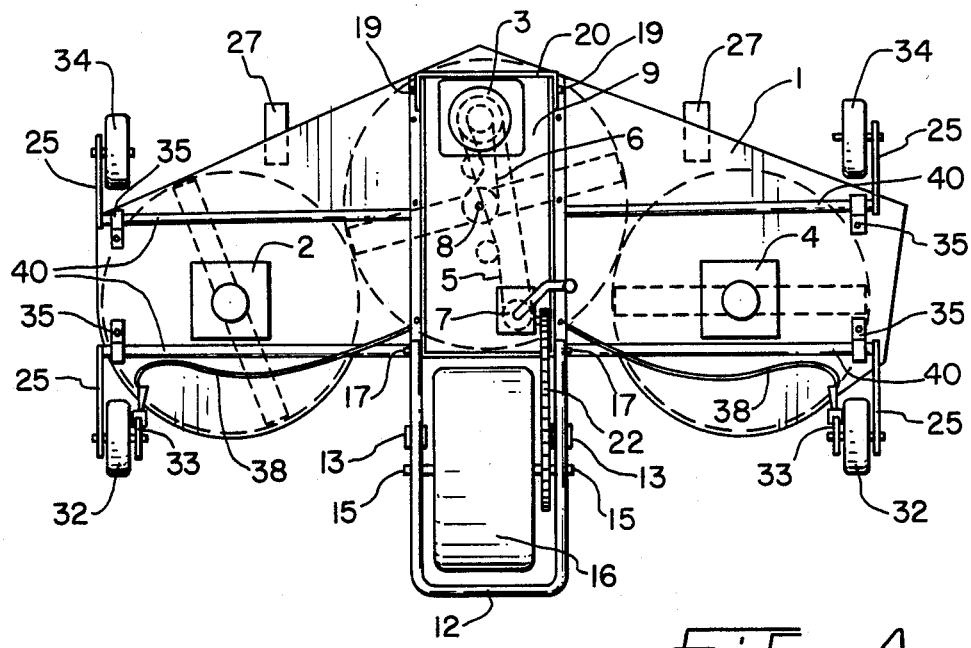

FIG. 4. Is a top view.

Figure 5:
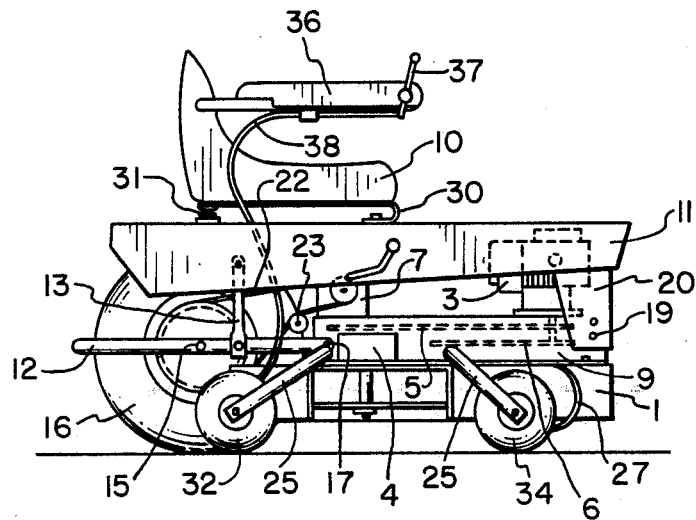

FIG. 5. Is a side view.

Figure 6:
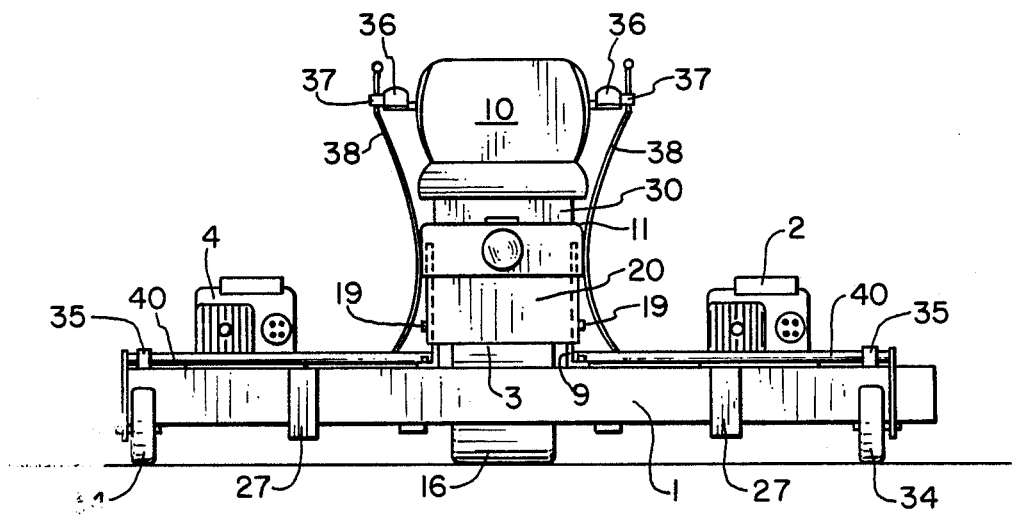

FIG. 6. Is a front view, all of them the embodiment where the steering is done with at least one brake on at least one of each lateral housing wheels.

Figure 7:
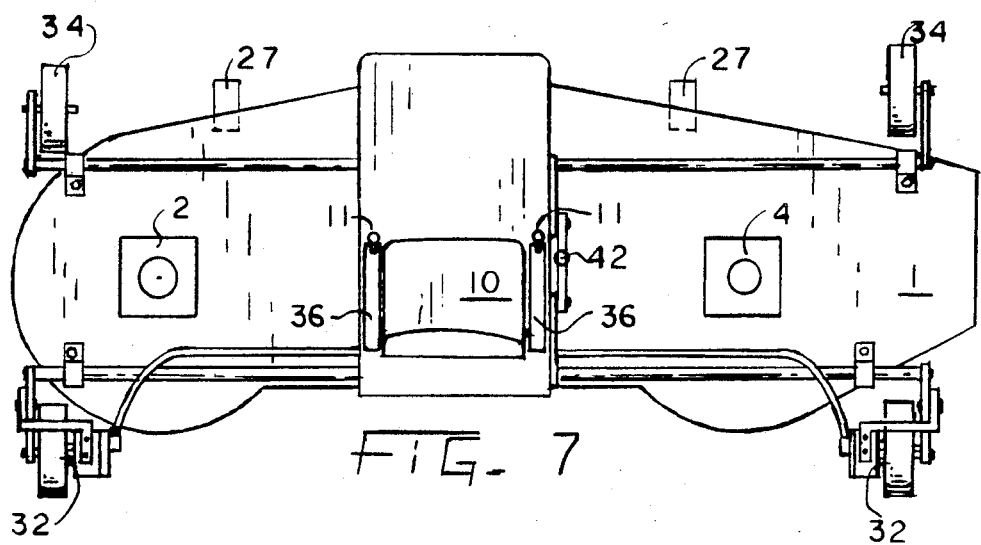

FIG. 7. Is a top view.

Figure 8:
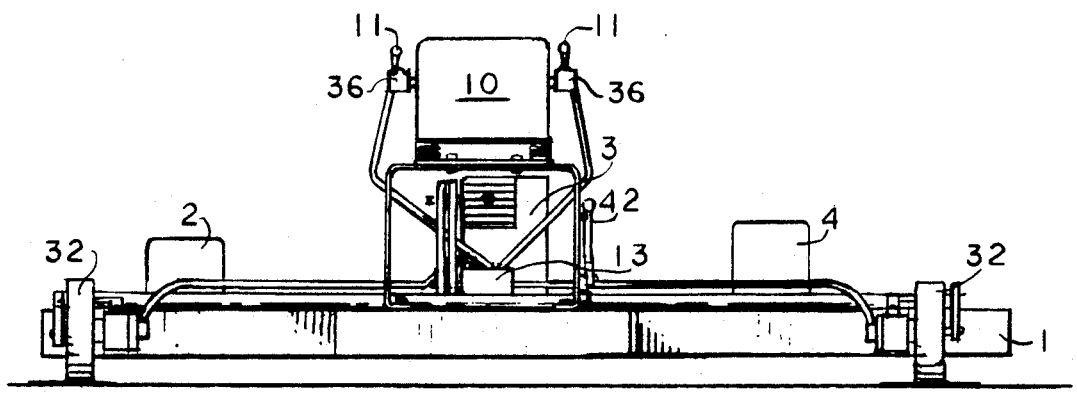

FIG. 8. Is a rear view.

Figure 9:
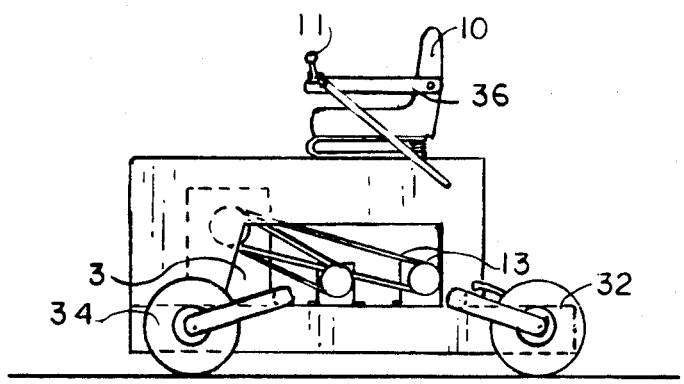

FIG. 9. Is a side view, each being the embodiment where the forward and reverse power of the lateral housing wheels both powers and steers the mower.

Figure 10:
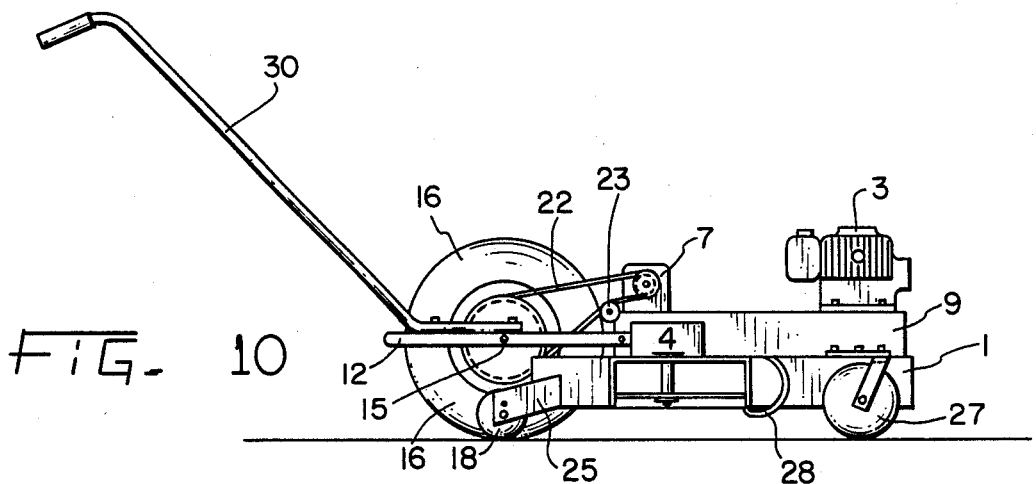

FIG. 10. Is a side view.

Figure 11:
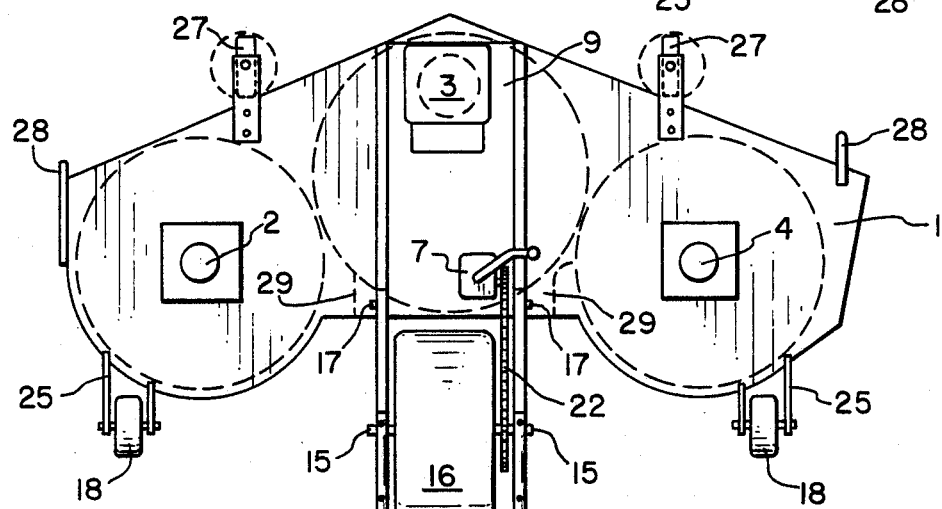

FIG. 11. Is a top view, both of the power handmower, steered with handle bars and at least one front castor wheel.

Figure 12:
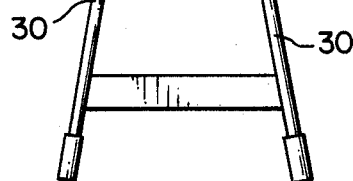

FIG. 12. Is a side view of the embodiment where the drive motor is not mounted on the housing, but mounted on a separate vehicle and the housing or implement mounted with the vertically restricting hinge to the under side of the vehicle.

DETAILED DISCRIPTON: EMBODIMENTS

According to FIG. 1. which shows a multi-blade mower housing 1, this application has 3 motors 2,3,4. The center motor 3 is a larger motor and has belts 5,6 which drive the center blade pulley 8 and the transmission belt 5. (see FIGS. 1 & 2)

This three motor application can be substituted for one larger motor located in the center and drive the two outer blades with the conventional belt system.

The drive belt 5 and the center blade belt 6 are both located within the inverted U shaped panel 9 which motor 3 is mounted on the top front portion, see FIGS. 1 & 2.

As the operator sets on seat 10 which is mounted on the long inverted channel 11, the weight of the operator is transferred mostly to the rear wheel's U shaped frame 12, being connected by vertical members 13 which are located just forward of the rear drive wheel's axle 15, thus the large portion of the operators weight is transferred to the rear drive wheel 16. Yet a potion of the weight is transferred to the rear portion of inverted member 9 by axis hinge 17, thus transferring some weight to the mower housing 1 and its rear wheels 18. This allows the rear drive wheel 16 to float independent of the mower housing 1 or an implement and softens the action transferred to the driver's seat over rough ground, while it maintains constant traction. The up and down action of the members 13 and 11 are then hinging on the pin-bearing 19 in the downward vertical channel 20 which is fixed to the forward portion of channel 11, thus some of the said weight is placed on the front guiding wheel 21.

The rear drive wheel is propelled by a chain or means 22 to the transmission 7 which has a spring loaded idler 23.

As the front wheel 21 is turned in bearing 24, a zero-turn is possible by turning around one of the rear mower housing's wheels 18 which are closely in line with the rear wheel's axle 15. Thus there is little scooting of the axis wheel 18 during turning. Within the rear mower housing wheel brackets 25 and the front wheel yoke 26 are a means of adjusting the cutting heights of the mower housing or implement.

On leading edge of mower housing 1 are anti-scalp means 27, 28 and on the rear of housing's under portion 29; means being wheels, skids, rollers, etc which could also replace wheels 18.

The embodiment shown in FIGS. 4, 5, & 6, shows the steering mode that uses at least one breaking system on at least one of each lateral housing wheels 32. And the front support wheels 34 can also be used as breaking wheels. Or wheels 34 can be eliminated and in their stead, members 27 can be replaced by castor wheels. These can also can be eliminated and the front steering wheel 21, FIG. 1 can also be replaced by a castor wheel. In each of the modes, steering is done by the brakes 33. Steering is done easily in these ways. To steer, as you sit on seat 10 with your arms on the arm rests 36 and your hands on the brake controls 37, steering is done almost effortlessly.

In the embodiment shown in FIGS. 7, 8, & 9, steering is done by the use of a hydraulic pump 13 and at least one hydraulic motor on at least one of the lateral housing wheels 2. Then by setting on seat 10 with your arms on the arms rests 11 and your hands on the controls 11, one wheel 2 can be driven one direction and the other wheel 2 can be driven the other direction, thus turning the mower housing is less than a zero turn radius.

The embodiment shown in FIGS. 10. and 11. the mower housing is steered by handle bars 30 while walking. With the drive wheel powering the housing, side pressure on handle bars 30, allows the housing to pivot around the drive wheel 16 as the castor wheels 27 turn with the thrust. Also the front guide wheel 21 in FIG. 1. can be changed to a castor wheel, thereby using just one castor in this application.

The next embodiment is shown in FIG. 12. The drive motor is not mounted on the housing, rather a two wheeled vehicle is created by eliminating the pivot bearing 17, which lets the rear drive wheel 16 float as shown in FIGS. 1 & 2; then seperate the frame 9 from the housing 1; thus the vehicle pivots and the whole vehicle is floated on the front pin bearing 19. as to it's relation to the housing. This gives the same lateral stability as the mode in FIGS. 1 & 2. It will be noted that in this mode the housing can be substitute for any other implement in other applications where a two wheeled vehicle is stablized with this vertically limited hinge and the implement with lateral wheels or skids which stablizes the vehicle laterally.

It will be noted that in FIGS. 4, 5, 6, 7, 8, & 9 the lateral housing wheels are mounted on torsion bars 40, these can be used on all embodiments and it makes the mower ride easier and takes more shock off the housing on rough ground.

It will also be noted that the seat uses a combination of a flat C shaped spring in front as it extends rearward under the seat to the back edge of the seat and it is mounted on the rear spring extension. Then the rear section of the seat is supported by at least one coils-spring which takes most of the shock from the mower or vehicle to the operator. In each of the embodiments, the housing or an implement is used in different applications, in each one of them, mowing is made easier and the equipment is easier to manufacture.

The embodiments, novel adaptations, modifications, and any arrangements thereof which those skilled in the art would notice, should not allow limiting the scope of this invention so as not to cover the scope of the invention in the following claims.

What is claimed is:

1. An energy propelled implement comprising;
    a generally horizontal transverse work performing apparatus;
    a means, including at least one drive wheel, mounted to the apparatus to self-propel the implement;
    means connecting the drive wheel to the apparatus allowing a floating vertical pivotal motion of the drive wheel relative to the apparatus,
    means to provide locomotor power to the drive wheel; and
    a sufficient number of mobilizing ground engaging support means embodied on the implement to enable it to operate on the ground while performing work;
    a steering and operating means mounted to the implement to steer and operate the implement which includes at least one of the mobilizing ground engaging support means, and at least one said pivotally attached drive wheel.

2. A implement as in claim 1 wherein there is at least one said support means located to each lateral portion of the apparatus; and
    at least one support means located generally on the opposing side of the apparatus from the drive wheel.

3. A implement as in claim 1 or 2 which includes an operator's seat selectively mounted to the implement that includes,
    a mounting means, for selectively distributing the weight of the operator between the drive wheel and at least one of the mobilizing ground engaging support means.

4. A implement as in claim 3 wherein at least one of the said support means include means for vertical height adjustment of the implement in relation to the ground it operates on; and
    a means mounted to the implement to raise and hold the apparatus in a retracted position.

5. An implement as in claim 4 wherein at least one of the support means include shock absorbing means to relieve the shock to the apparatus as it travels over rough ground.

6. An implement as in claim 5 wherein the shock absorbing means encludes at least one torsion bar.

7. An implement as in claim 1, wherein at least one of the support means includes at least one wheel.

8. An implement as in claim 4 wherein the said, at least one support means including at least one wheel, further includes a means for braking the rotary action of at least one of the wheels included on at least one of the support means located on at least one lateral side of the apparatus, as at least, a part of the said steering and operating means.

9. An implement as in claim 7 wherein at least one of the support means includes at least one castoring type wheel.

10. A vegetation cutting implement comprising; a transverse housing with embodied power driven cutter means; and
   a self-propelled drive means which includes at least one drive wheel;
   means for mounting the drive wheel to the housing allowing a floating vertical pivotal motion only of the drive wheel in relation to the housing
   means to provide locomotor power to the drive wheel;
   at least one support wheel mounted to each lateral portion of the housing;
   at least one castor type support wheel mounted to the housing generally on the opposing side from the drive wheel; and
   at least one projecting walk behind type handle means which is mounted to the implement in such a way as to allow a walking operator to steer and operate the implement by said handle means.

11. An implement as in claim 10 wherein at least one of the support wheels includes a means to adjust the height of the housing in relation the ground it operates on.

12. A vegatation cutting implement comprising;
   a generally transverse housing with power-driven cutter means; and
   a means, including at least one power driven drive wheel, mounted to the housing to self-propel the implement;
   means attaching the drive wheel to the housing allowing a floating vertical pivotal motion of the drive wheel, and
   support wheels selectively attached to the housing, at least one to each lateral side of the drive wheel, at least one on the opposing side from the drive wheel;
   a braking means mounted to at least one of the support wheels on at least one of the lateral sides of the housing to effectuate the steering of the vehicle by the selected use of said braking means;
   an operators seat selectively mounted to the implement; and
   a mounting means for selectively distributing the weight of the operator between the drive wheel and at least one of the housing support wheels.

13. A implement as in claim 12 wherein at least one of the said support wheels is a castoring type wheel.

14. A implement as in claim 12 or 13 wherein the housing support wheels include at least one torsion bar to relieve the shock to the housing as it travels over the rough ground.

15. An implement supporting vehicle comprising; a longitudinally extending frame having a longitudinally extending center line, a rear drive wheel and front guiding wheel, said rear drive wheel and front guiding wheel attached to and supporting said frame along said center line;
   an implement having a lateral transverse width greater than said frame and attached to said frame to stablize the vehicle in an upright position;
   at least two support wheels adjustably mounted to said implement with at least one on each lateral side of the implement to engage the ground on either side of the vehicle for maintaining the vehicle in the upright position;
   a means for mounting the implement to the frame of the vehicle including at least one pivoted hinge which restricts the lateral movement of the implement in relation to the frame and allows for a vertical movement of the implement in relation to the frame as the vehicle moves over the ground while maintaining the vehicle in a selected upright position.

16. A vehicle as in claim 15 which includes a means mounted to the frame to hold implement in a retracted position in relation to the ground and the frame.

17. A vehicle as in claim 15 or 16 wherein at least one of the support wheels, at least one on either lateral side of the drive wheel, include a means for absorbing shock to the implement as it travels over a rough surface.

18. An energy propelled vehicle comprising;
   a longitudinally extending frame means having a longitudinally extending center line,
   support wheels, at least one forward and at least one rearward, supporting and attached to said frame means along said longitudinally extending center line,
   a means embodied with the frame means, that includes at least one of the said support wheels, for locomotor driving, steering, and operating the vehicle;
   a lateral transverse apparatus attached to the frame, and extending laterally of said centerline of sufficient lateral transverse width to hold the vehicle in a selected upright position; and
   said apparatus having at least two lateral mobilizing ground engaging means, at least one attached to each lateral portion of the apparatus to implement the vertical control of the vehicle as to a selected vertical position;
   a means for mounting the apparatus to the frame of the vehicle which includes at least one transverse vertical pivoting hinge means;
   said hinge means allowing for limited and controlled lateral movement of the apparatus in relation to the frame and allows for the floating vertical movement of the apparatus in relation to the frame of the vehicle and the ground, thereby maintaining the vehicle in a selected upright position in both a static or operative mode.

19. A vehicle as in claim 18 wherein there is a means mounted to the frame for adjustably holding the apparatus, in relation to the frame and the ground.

20. A vehicle as in claim 18 or 19 wherein the apparatus is a mower or other like implement for performing certain work on the ground it operates over; and
   at least one of the ground engaging means includes at least one wheel.

21. A vehicle as in claim 20 wherein the said ground engaging wheel is adjustably mounted.

22. A vehicle as in claim 20 wherein the ground engaging wheel is mounted with shock absorbing means.

23. A vehicle as in claim 22 wherein the shock absorbing means includes at least one torsion bar.

24. A vehicle as in claim 20 wherein the lateral apparatus ground engaging wheels, at least one on each lateral portion of the apparatus, includes braking means attached for braking selectively either lateral support wheel to effectuate an ease in steering of the vehicle in a closer turn radius.

25. A vehicle as in claim 24 wherein the means mounting the apparatus to the vehicle, includes a height adjusting means.

26. A vehicle as in claim 18 or 19 wherein the vehicle support wheels are at least one of them a power driven drive wheel and at least one of them a steerable wheel for steering and operating the vehicle.

27. An energy propelled vehicle comprising;
a generally longitudinal body means which includes;
mobilizing support means arranged along the longitudinal axis of the vehicle; attached and supporting said body means;
an operating means embodied with the body means using said moblizing support means to both locomotor drive and steer the vehicle,
a vertical stablizing means for the vehicle comprising;
a generally transverse member attached to the body means and extending outwardly from at least one lateral side of the longitudinal axis of the vehicle sufficiently to hold the vehicle in a selected vertical position; and
said member having moblizing surface engaging means to engage the surface the vehicle is operated on;
means for securing the member to the vehicle body means that includes;
at least one transverse horizontal controlling hinge means which restricts and controls the lateral movement of the member in relation to the vehicle body means and allows for a vertical floating movement of the member in relation to the body means of the vehicle, thereby holding the vehicle in a selected upright position.

28. A vehicle as in claim 27 that includes a means embodied with the body means to adjust the transverse member in relation to the body means and the surface the vehicle operates on, thereby allowing the transverse member to lock out the floating movement and thereby be held in a retracted position.

29. A vehicle as in claim 27 wherein the transverse member is an implement for performing work on the ground the vehicle operates on.

30. A vehicle as in claim 29 wherein the moblizing surface engaging means on the transverse member include at least one wheel.

31. A vehicle as in claim 30 wherein said surface engaging means are adjustably mounted in relation to the transverse member and the surface the vehicle operates on.

32. A vehicle as in claim 31 further comprising a means embodied with the transverse member to yield and absorb the shock of the tansverse member and body means as it travels over a rough surface.

33. A vehicle as in claim 32 wherein the means to yield and absorb the shock of the transverse member includes at least one torsion bar.

34. A vehicle in claim 27 wherein the transverse member's surface engaging means include at least one braking means on at least one lateral side of the transverse member to effectuate, at least a part of, the steering.

35. A vehicle as in claim 27 wherein the transverse member is a mowing apparatus for mowing vegetation.

36. A vehicle as in claim 27 wherein the means for securing the member to the vehicle body means includes vertical adjusting means to select different vertical positions of the the vehicle in relation the surface it operates on.

37. A vehicle as in claim 27 wherein the means for securing the member to the body means includes a means to adjust the height of the transverse member in relation to the body means.

* * * * *